United States Patent
Kuschel

(10) Patent No.: US 7,478,468 B2
(45) Date of Patent: Jan. 20, 2009

(54) METHOD FOR THE PRODUCTION OF A RIM HOLE IN HOLLOW PROFILES

(75) Inventor: Stephan Kuschel, Hamburg (DE)

(73) Assignee: Daimler AG, Stuttgart (DE)

( * ) Notice: Subject to any disclaimer, the term of this patent is extended or adjusted under 35 U.S.C. 154(b) by 134 days.

(21) Appl. No.: 10/563,755

(22) PCT Filed: Jun. 30, 2004

(86) PCT No.: PCT/EP2004/007069

§ 371 (c)(1),
(2), (4) Date: Jun. 29, 2006

(87) PCT Pub. No.: WO2005/005075

PCT Pub. Date: Jan. 20, 2005

(65) Prior Publication Data

US 2006/0248704 A1    Nov. 9, 2006

(30) Foreign Application Priority Data

Jul. 9, 2003    (DE) ................... 103 30 886

(51) Int. Cl.
*B23P 11/00* (2006.01)

(52) U.S. Cl. .............. 29/505; 29/515; 29/516; 29/525.01; 403/282; 72/325; 72/372; 72/373

(58) Field of Classification Search ........... 29/897.2, 29/432.2, 509, 515, 516, 525.01, 421.1; 72/353.2, 72/325, 358, 372, 373, 379.2, 464, 55; 403/281, 403/282, 283

See application file for complete search history.

(56) References Cited

U.S. PATENT DOCUMENTS 1,675,910 A * 7/1928 Riker .................. 72/325

(Continued)

FOREIGN PATENT DOCUMENTS

DE    43 22 632 A1    1/1995

(Continued)

OTHER PUBLICATIONS

Written Answer of the International Search Report, Jan. 5, 2005.

(Continued)

*Primary Examiner*—Jermie E Cozart
(74) *Attorney, Agent, or Firm*—Crowell & Moring LLP

(57) ABSTRACT

In a method for the production of a rim hole in hollow profiles, a tubular piece is pushed into the hollow profile and placed there in such a way that it coaxially surrounds the location of the rim hole to be produced. The hollow profile is then acted upon from outside to inside at this location by a tool, with the rim hole being formed. In order to make possible a rim hole in hollow profiles in a relatively simple manner, this rim hole also satisfying high strength requirements even in the case of a small wall thickness of the hollow profile, it is proposed to first punch two opposite holes out of the hollow profile. At least one of these holes has a diameter which is smaller than that of the rim hole to be produced. The tubular piece is then inserted into the hollow profile interior, so that it comes to lie there coaxially to the common axis of the holes. The hollow profile material of the hollow profile section located between the hole edge and the inside of the tubular piece is then drawn into the hollow profile interior by at least one punch until it bears flat against the inside of the tubular piece.

18 Claims, 3 Drawing Sheets

U.S. PATENT DOCUMENTS

| | | | | |
|---|---|---|---|---|
| 2,373,901 | A * | 4/1945 | Lowery | 72/335 |
| 2,702,577 | A * | 2/1955 | Wheelon et al. | 72/467 |
| 2,928,450 | A * | 3/1960 | Belding | 72/328 |
| 3,487,668 | A * | 1/1970 | Fuchs, Jr. | 72/55 |
| 5,606,888 | A * | 3/1997 | Grabbe | 72/443 |
| 5,799,524 | A | | 9/1998 | Schaefer et al. |
| 6,109,086 | A * | 8/2000 | Gambrel et al. | 72/326 |
| 6,186,696 | B1 | | 2/2001 | Valin |
| 6,513,243 | B1 * | 2/2003 | Bignucolo et al. | 29/897.2 |
| 2003/0126730 | A1 | | 7/2003 | Barber et al. |

FOREIGN PATENT DOCUMENTS

| | | | |
|---|---|---|---|
| JP | 01312209 A | * | 12/1989 |
| JP | 2000-168327 | | 6/2000 |
| WO | WO 01/60544 A2 | | 8/2001 |

OTHER PUBLICATIONS

PCT/IPEA/409, International Preliminary Report on Patentability.
International Search Report.

\* cited by examiner

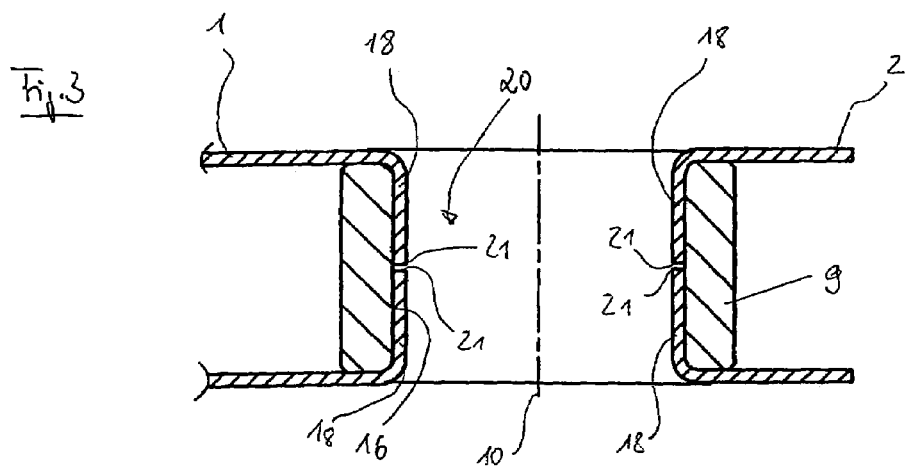
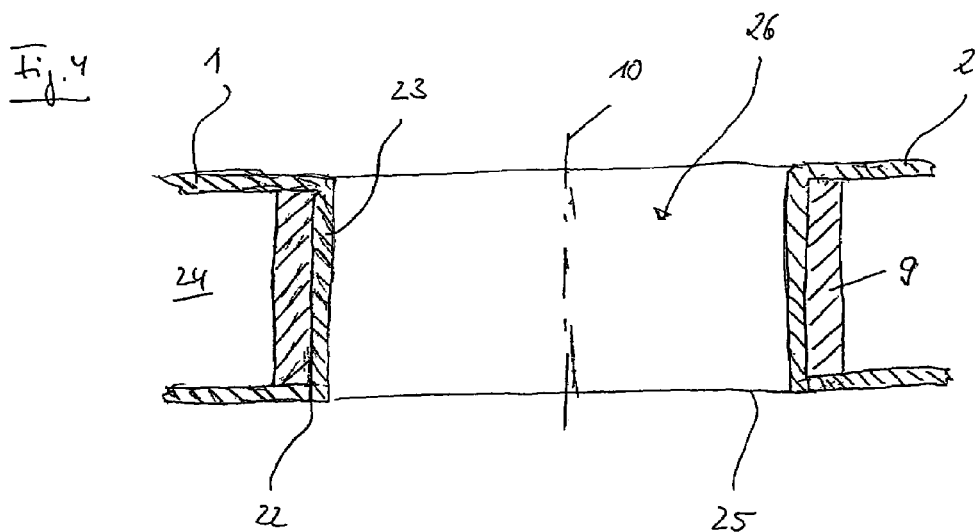

METHOD FOR THE PRODUCTION OF A RIM HOLE IN HOLLOW PROFILES

BACKGROUND AND SUMMARY OF THE INVENTION

This invention relates to a method for the production of a rim hole in hollow profiles.

A method of this general type has been disclosed by German document DE 43 22 632 A1. In this case, the hollow profile is used as a vehicle strut for the mounting of axles, wheel suspensions or the like and is shaped in a first step by hydroforming into an outer contour corresponding to the loading requirements. Then, in a second step, centering holes are incorporated at the ends of the hollow profile, which are to have a mounting seat for accommodating rubber mounts, and a spacer in the form of a tubular piece is inserted into the hollow profile centrally relative to the centering holes. Finally, a flow drill is inserted into the centering holes in the end region, with the flow drill forming a rim hole during operation, and the rim hole extending inside the tubular piece. In this case, the rim hole forms the mounting seat. However, a precondition of the flow drilling process is that there must be a certain ratio between the wall thickness of the hollow profile and the diameter, to be produced, of the rim hole. The wall thickness of the hollow profile is to be especially large in relation to the diameter. This usually cannot be maintained when applied in automobile construction, since the need to save weight leads to thinner and thinner sheets. Furthermore, due to the process, the wall thickness of the rim hole decreases to virtually zero in the direction of application during flow drilling. This has an adverse effect on the strength and rigidity properties of the mount to be produced, despite the inserted tubular piece mentioned.

The object of the invention is to develop a method of the type mentioned in which a rim hole can be made in hollow profiles in a relatively simple manner, and in which the rim hole complies with high strength requirements even in the case of a small wall thickness of the hollow profile.

The object is achieved according to the invention.

Owing to the invention, in order to produce the rim hole, it is merely necessary to punch out two opposite holes and bend over at least one of the hole edges, which are drawn into the hollow profile interior and thus form the rough contour of the rim hole to be produced. In order to achieve the desired exact contour of the rim hole, a tubular piece is inserted into the hollow profile interior and placed at the location of the rim hole to be produced, before the drawing-in from the open end of the hollow profile. In this case, the inside of the tubular piece serves at least as a pattern for the desired contour of the rim hole, the hole edges being pressed against the inside of the tubular piece when they are being drawn in, as a result of which they achieve this same contour. Owing to the fact that the hole edges are not subjected to any change in wall thickness when being bent over into the hollow profile interior, the tubular design of the rim hole, in addition to the already rigid tubular form per se, has especially high rigidity, which enables the rim hole, without sustaining damage, to cope with even higher mechanical loads, for which sufficient rigidity and strength are indispensable. This is additionally promoted due to the fact that the tubular piece remains in the hollow profile. In contrast to the flow drilling, the ratio of diameter to length of the rim hole is not limited to a specific value during the production of the rim hole, so that rim holes of virtually any desired dimensions can be advantageously formed. As a result of the uniformity of the wall thickness of the hollow profile, smaller wall thicknesses may also be selected when designing the hollow profile, while maintaining sufficient rigidity in the region of the rim hole. This contributes to the reduction in weight of the corresponding component and, when the component is used in the motor vehicle, to a reduction in weight of the latter. Furthermore, the method according to the invention has an advantageous effect for the painting of the component, i.e. of the hollow profile, since the surface of the rim hole is relatively regular and thus the paint can adhere to that surface. When steel is used for forming the hollow profile, there are advantageously no corrosion problems, as are brought about, for example, as a consequence of the flow drilling process.

In a preferred development of the invention, the hollow profile is perforated by the interaction of a perforating die, pushed into the hollow profile, and two opposite perforating punches, between which the hollow profile lies. In a mechanically simple manner, this enables holes having a highly precise hole pattern to be formed and enables the hole edge to run uniformly. This ensures the uniformity of the subsequent drawing-in operation and is therefore beneficial to the process reliability of the production of the desired rim hole.

In a further, especially preferred development of the invention, the hollow profile is formed by the internal high pressure forming process and perforated in the internal high pressure forming tool required for this purpose. Here, too, a highly precise hole pattern is obtained, the holes being formed by perforating punches which act upon the hollow profile with a cutting action against the internal high pressure which prevails in the hollow profile and which functions as supporting pressure suppressing subsidence or collapse. In an economical manner in terms of the method, the hollow profile is shaped in the same tool in accordance with the requirements, thereby resulting in a production plant which is extremely compact in terms of apparatus due to the integration of the perforating punches in the internal high pressure forming tool.

In a further preferred configuration of the invention, the drawing-in operation is effected by a follow-on contour of the perforating punch, this follow-on contour adjoining a cutting edge formed on the end face of the perforating punch. Due to the arrangement of a follow-on contour on the perforating punch, the perforating and drawing-in operation is simplified and the production time for the rim hole is reduced, since the hollow profile has to be acted upon, at least from one side, merely by a perforating punch which is lowered further into the hollow profile interior in a simple manner, so that the follow-on contour of the perforating punch comes into contact with the hole edge and then uniformly bends the latter over and thus draws it into the hollow profile interior. The entire production apparatus for producing the rim hole is further simplified to a considerable extent by combining the functions of two tools, namely the drawing-in tool and the perforating tool, in the perforating punch.

In a further preferred development of the invention, the hollow profile material of the hollow profile section is drawn into a recess of the tubular piece, this recess encircling in an annular manner and being open toward the end face of said tubular piece. On account of the drawing-in in this way, part of the tubular piece forms a center section of the rim hole. This may be done to such an extent that, with a relatively small drawing-in length, the drawn-in hollow profile material serves only to fasten the tubular piece, which fully maintains the function of the rim hole, for example as a bearing in an axle strut. The tubular piece in this case may be made of bronze or plastic, as a result of which it can additionally perform the function of a plain bearing. No large wall thickness of the hollow profile is required in order to hold the tubular piece, as a result of which said wall thickness can be reduced to such an extent that the drawn-in hollow profile material if necessary produces low rigidity and strength. These properties are alternatively provided by the tubular piece, which is relatively thick-walled. The tubular piece may also be made of a light alloy or of a steel material, as a result of which it can likewise be shaped by the internal high pressure forming process.

In a further preferred configuration of the invention, the hollow profile material is drawn in in such a way that it engages behind undercut surfaces of the recess of the tubular piece. In this way, not only is a frictional connection achieved between the hollow profile and the pushed-in tubular piece, as is apparent in the directly preceding development of the invention, but positive locking is also achieved by the catching behind the undercut surfaces of the recess of the tubular piece, so that the tubular piece is held in the hollow profile in an especially reliable manner.

In a preferred development of the invention, the hollow profile is perforated with holes of the same size being formed. As a result of holes of the same size being formed, uniform process control during perforating, and in particular during drawing-in, is ensured. In addition, the control of the tools during the drawing-in operation is simplified, since the same amount of hollow profile material is bent over on both sides of the hollow profile, a factor which produces a uniform drawing-in length and whereby the sequence of movements of the drawing-in tools is identical, so that the latter can be connected to a single control loop.

In a further preferred development of the method according to the invention, the hollow profile is perforated with holes of different size being formed. Furthermore, the larger hole is dimensioned in such a way that its hole edge terminates flush with the inside of the tubular piece. The hollow profile material is drawn in only on the side of the smaller hole, the hole diameter and the hollow profile section having the hollow profile material being dimensioned in such a way that the hollow profile section extends across the entire length of the tubular piece after the drawing-in. In this way, firstly the production process is shortened, since hollow profile material only needs to be drawn in from one side, whereas only the hole is formed on the other side. Secondly, from this one side on which the smaller hole is formed, so much hollow profile material is drawn in that the latter extends at least up to the edge of the larger hole on the other side of the hollow profile. In this case, firstly the tubular piece is reliably enclosed and secondly a rim hole is formed which is completely gapless and level on account of its one-piece configuration. Thus, due to its freedom from discontinuities and its high surface quality, the rim hole is given especially high bending rigidity and strength and also above average slidability properties, so that the rim hole is suitable in an especially effective manner for the use of plain bearings. This special configuration of the invention applies in particular to bushes of large diameter.

The invention is explained in more detail below with reference to several exemplary embodiments shown in the drawings.

BRIEF DESCRIPTION OF THE DRAWINGS

FIG. 3 shows a hollow profile section, drawn in on both sides with formed rim hole, in a lateral longitudinal section, FIG. 4 shows a perforated hollow profile section, drawn in on one side with fully formed rim hole of a method according to the invention, in a lateral longitudinal sectional illustration.

DETAILED DESCRIPTION OF THE INVENTION

Figure 1:
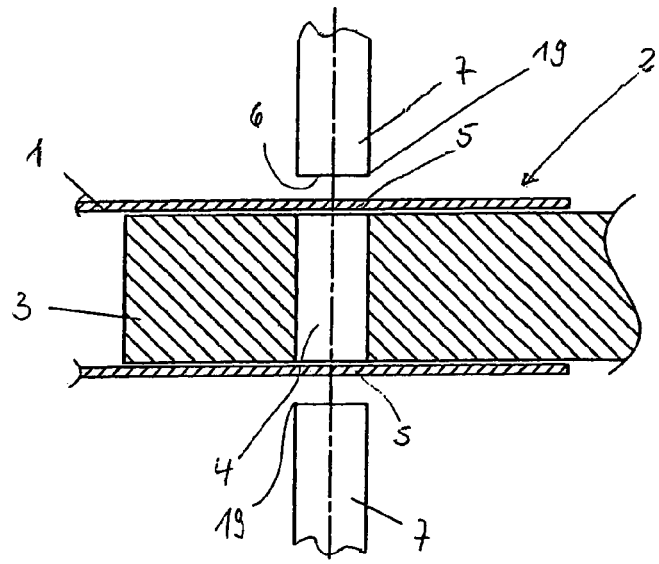
FIG. 1 shows a hollow profile section, in preparation for a perforating operation of a method according to the invention, in a lateral longitudinal section.
Figure 2:
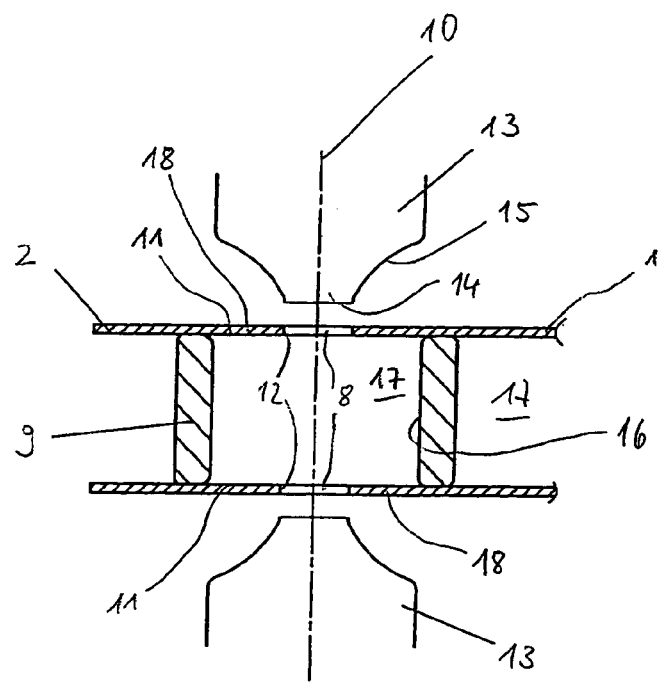
FIG. 2 shows a lateral longitudinal section of the hollow profile, perforated in the meantime, from FIG. 1 in preparation for a drawing-in operation of a method according to the invention.

FIG. 1 shows the first working phase of the production of a rim hole on a hollow profile 1 which is made of a steel material or a light alloy and can be shaped by means of an internal high pressure forming process. The hollow profile produced in this way can preferably be a strut with bearing bush in automobile construction, in particular a tension or compression strut in the chassis region. For the first phase of the production process, in which a perforating operation is carried out on the hollow profile 1, a perforating die 3 is pushed into the open end 2 of the hollow profile 1 and arranged at the location of the rim hole to be produced. To this end, the perforating die 3 has a through-hole 4 of cylindrical design. Lying opposite the openings 5 of the through-hole 4 are the end faces 6 of two perforating punches 7 which are arranged outside the hollow profile 1. In their shape and in their diameter, the end faces 6, provided with a cutting edge 19, of the perforating punches 7 are dimensioned in such a way that, during the perforating of the hollow profile 1, they can plunge with only slight clearance into the through-hole 4 of the perforating die 3. After the two perforating punches 7, which are opposite one another and between which the hollow profile 1 lies, have completed the perforating operation, the perforating die 3 is removed again from the end 2 of the hollow profile 1. As can be seen from FIG. 2, the hollow profile 1 is then transferred with its two opposite, punched-out holes 8 into a drawing-in station. A cylindrical sleeve-shaped tubular piece 9 is now pushed into the hollow profile end 2 and is placed in the hollow profile 1 in such a way that it coaxially surrounds the location of the rim hole 20 to be produced, the axis 10 of the tubular piece 9 being identical to the hole axis of the two holes 8. The tubular piece 9, which can be made, for example, of plastic, steel or a light alloy, possibly also of bronze, has an inside diameter which markedly exceeds the hole diameter. The resulting hollow profile section 18 covering the openings 11 of the tubular piece 9 and lying between the hole edges 12 and the inside 16 of the tubular piece 9 forms the hollow profile material to be drawn in for producing a rim hole 20. Two drawing-in punches 13 which are arranged in such a way that they can be guided in a reciprocating manner coaxially to the axis 10 of the tubular piece then act from outside on the perforated hollow profile 1. With a cylindrical, short extension 14 which lies centrally and is formed on the respective drawing-in punch 13 for centering purposes, the drawing-in punches 13 plunge into the respective hole 8, after which, during the further movement of the drawing-in punches 13 into the hollow profile interior 17, the hollow profile section 18, by means of a concave drawing-in contour 15, adjoining the extension 14 at the rear side, of the punch 13, is displaced until it bears flat against the inside 16 of the tubular piece 9 and is pressed in place there. Firstly, the hollow profile material, thus drawn into the hollow profile interior 17, of the hollow profile section 18 fixes the tubular piece 9 in a rattleproof manner in the hollow profile 1 by means of the friction grip, produced via the applied pressure, between the inside 16 of the tubular piece 9 and the hollow profile section 18. Secondly, the drawn-in hollow profile section 18 forms the desired rim hole 20.

The drawing-in contour 15 of the drawing-in punch 13 may also be formed by a follow-on contour, adjoining the cutting edge 19, of the perforating punch 7. In this case, however, it is necessary in the sequence of the production operation to withdraw the perforating punch 7 slightly after the perforating, so that the tubular piece 9 can be pushed into the hollow profile end 2 and be placed accordingly. The perforating punch 7 then travels into the hole 8 and draws in the hollow profile material of the hollow profile section 18 as before. It may be noted here that the hollow profile material is supported on the tubular piece 9 during the drawing-in operation, so that the hollow profile 1 cannot collapse. After completion of the drawing-in operation, the punches 13 or 7 are removed from the hollow profile 1. The tubular piece 9, which has produced the supporting effect and is now held by the rim hole 20 produced, remains permanently in the hollow profile 1. Due to the fact that it is in one piece with the hollow profile 1, the rim hole 20 produced also has especially high strength and rigidity relative to mechanical loads. In this respect, it is advantageous that, during the perforating, the hole size of the holes 8 produced is configured in such a way that that proportion of the hollow profile material of the hollow profile section 18 that can be drawn in, in the surrounding area of these holes 8, jointly corresponds at most to the mountable length of the tubular piece 9, since otherwise, when the hollow profile 1 is drawn in on both sides, the hollow profile sections 18 will overlap on both sides in the hollow profile interior 17, a factor which drastically restricts the possible use of the formed rim hole 20 or possibly does not allow it to be used in a chassis strut. In the event of the drawing-in being effected on one side, the drawn-in hollow profile material would protrude on the other side of the tubular piece 9, a factor which is likewise not desirable in many applications.

The rim hole 20 which can be seen from FIG. 3 is created in such a way that the hollow profile sections 18 drawn in on both sides come to lie with their terminating edges 21 approximately centrally relative to the tubular piece 9. The rim hole 20 is the result of the method steps from FIGS. 1 and 2, the hollow profile 1 having been perforated in such a way that opposite holes 8 of the same size have been created on both sides. Although the punching of holes 8 of different size is conceivable, during which the terminating edges 21 of the hollow profile sections 18 then come to lie eccentrically when the hollow profile material is drawn in, the forming of holes 8 of the same size is advantageous in the sense that the perforating die 3 can be of relatively simple design, since its through-hole 4 can simply be designed to be cylindrical without widening of the hole 4 being necessary.

A variant of the rim hole 20 can be seen from FIG. 4. In deviation from its previous design, the hollow profile 1 is perforated on one side in such a way that the hole edge 22 terminates flush with the inside 16 of the tubular piece 9. In contrast, on the opposite side of the hollow profile 1, a hole 8 is produced which is considerably smaller in its dimensions. From this side, the hollow profile material of the hollow profile section 23 located between the hole edge of the small hole and the inside 16 of the tubular piece 9 is now drawn into the hollow profile interior 24. Since the diameter of the larger hole 25 corresponds to the inside diameter of the tubular piece 9 and the length of the drawn-in hollow profile section 23 corresponds to the sum of the length of the tubular piece 9 and twice the wall thickness of the hollow profile 1, a rim hole 26 is produced which extends across the entire length of the tubular piece 9, as a result of which the latter is completely enclosed on the inside 16.

Figure 5:
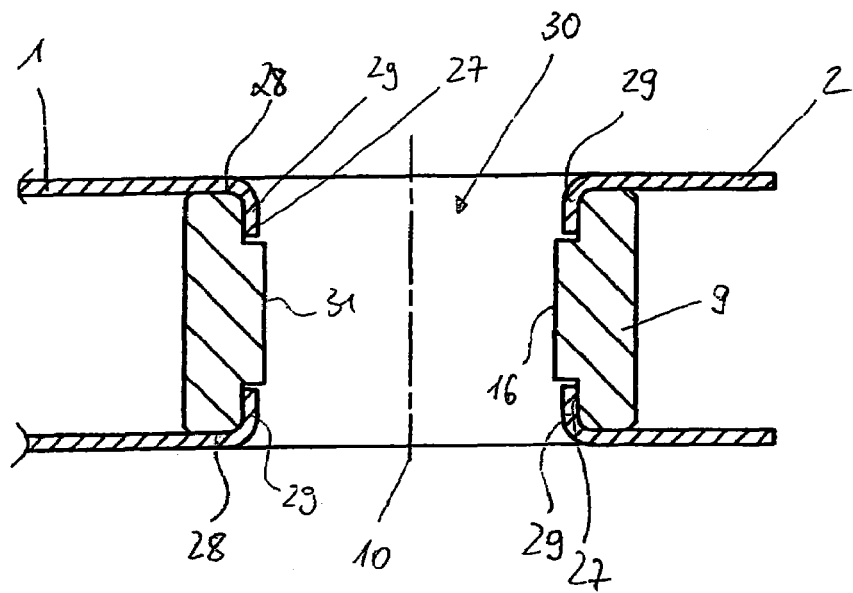
FIG. 5 shows a perforated hollow profile section, drawn in on both sides, with hole edges drawn into a recess of a tubular piece arranged in the hollow profile, and with a rim hole of a method according to the invention being formed, in a lateral longitudinal sectional illustration.

A further variant of the invention is shown in FIG. 5. In deviation from the preceding exemplary embodiments, the tubular piece 9 has a recess 27 which encircles in an annular manner and is open toward the end face 28 of the tubular piece 9. During the perforating operation, a relatively large hole 8 is punched out on both sides in the process, so that only a small amount of hollow profile material can be drawn in during the drawing-in operation. The length of the corresponding hollow profile section 29 is in this case dimensioned in such a way that the hollow profile material is merely drawn into the recess 27 of the tubular piece 9 and pressed in place there. The resulting rim hole 30 is formed essentially by that section 31 of the inside 16 of the tubular piece 9 which is left without a recess.

Figure 6:
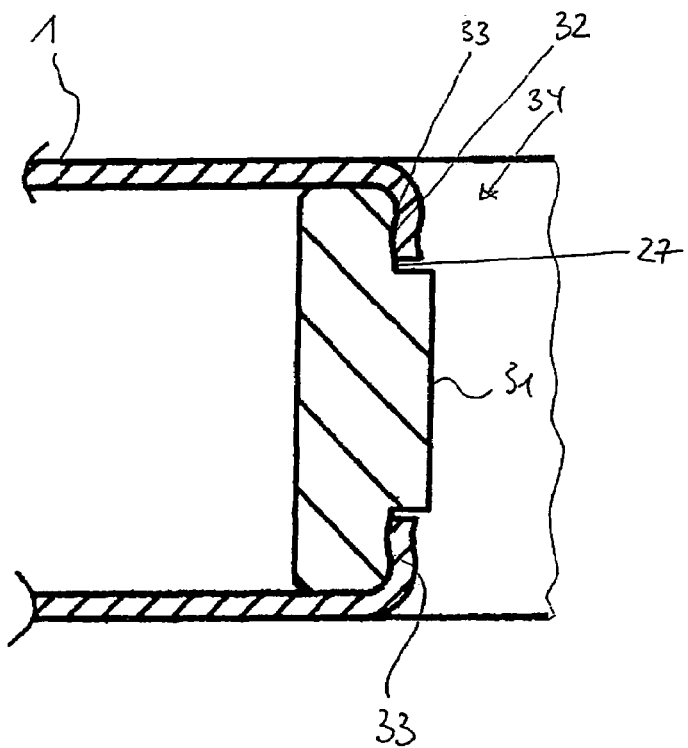
FIG. 6 shows a hollow profile section, perforated and drawn in at the hole edges, according to the invention, in a positive-locking connection with a tubular piece arranged in the hollow profile, in a lateral longitudinal section.

A variant of the type of rim hole 30 from the preceding exemplary embodiment can be seen from FIG. 6. Here, the recess 27 also has an annular groove 32, the flanks of which form undercut surfaces 33. When the hollow profile material of the hollow profile section 29 is drawn in, the hollow profile material engages behind these undercut surfaces 33, as a result of which a positive-locking connection between the tubular piece 9 and the hollow profile 1 is formed. In its shape, the rim hole 34 created in the process differs only slightly from the rim hole 30.

The invention claimed is:

1. A method for production of a rim hole in a hollow profile comprising:

punching two opposite holes out of a hollow profile, at least one of the two holes having a diameter which is smaller than that of the rim hole to be produced, by interaction of a perforating die pushed into the hollow profile, and two opposite perforating punches between which the hollow profile lies, pushing a tubular piece into an interior of the hollow profile in such a way that the tubular piece coaxially surrounds the location of the rim hole to be produced and comes to lie there coaxially to a common axis of the opposite holes, and drawing hollow profile material of of a section the hollow profile located between an edge of at least one of the opposite holes and an inside of the tubular piece into the hollow profile interior by at least one punch until said hollow profile material bears flat against the inside of the tubular piece so as to form the rim hole.

2. The method as claimed in claim 1, wherein the drawing operation is effected by a follow-on contour of the punch adjoining a cutting edge formed on an end face of the punch.

3. The method as claimed in claim 2, wherein the two opposite holes are the same size.

4. The method as claimed in claim 1, wherein the two opposite holes are the same size.

5. A method for production of a rim hole in a hollow profile comprising:

punching two opposite holes out of a hollow profile, at least one of the two holes having a diameter which is smaller than that of the rim hole to be produced, by interaction of a perforating die pushed into the hollow profile, and two opposite perforating punches between which the hollow profile lies, pushing a tubular piece into an interior of the hollow profile in such a way that the tubular piece coaxially surrounds the location of the rim hole to be produced and comes to lie there coaxially to a common axis of the opposite holes, and drawing hollow profile material of of a section the hollow profile located between an edge of at least one of the opposite holes and an inside of the tubular piece into the hollow profile interior by at least one punch until said hollow profile material bears flat against the inside of the tubular piece so as to form the rim hole, wherein the hollow profile material of the hollow profile section is drawn into a recess of the tubular piece which encircles in an annular manner, and is open toward an end face of the tubular piece.

6. The method as claimed in claim 5, wherein the hollow profile material is drawn in such a way that the hollow profile material engages behind undercut surfaces of the recess of the tubular piece.

7. The method as claimed in claim 6, wherein the two opposite holes are the same size.

8. The method as claimed in claim 6, wherein the two opposite holes are holes of different sizes, wherein a larger hole of the opposite holes is dimensioned in such a way that its hole edge terminates flush with the inside of the tubular piece, and wherein the hollow profile material is drawn in only on a side of a smaller hole of the opposite holes, the hole diameter and the hollow profile section being dimensioned in such a way that the hollow profile section extends across the entire length of the tubular piece after the drawing operation.

9. The method as claimed in claim 5, wherein the two opposite holes are the same size.

10. The method as claimed in claim 5, wherein the two opposite holes are holes of different sizes, wherein a larger hole of the opposite holes is dimensioned in such a way that its hole edge terminates flush with the inside of the tubular piece, and wherein the hollow profile material is drawn in only on a side of a smaller hole of the opposite holes, the hole diameter and the hollow profile section being dimensioned in such a way that the hollow profile section extends across the entire length of the tubular piece after the drawing operation.

11. A method for production of a rim hole in a hollow profile comprising:

punching two opposite holes out of a hollow profile, at least one of the two holes having a diameter which is smaller than that of the rim hole to be produced, by interaction of a perforating die pushed into the hollow profile, and two opposite perforating punches between which the hollow profile lies, pushing a tubular piece into an interior of the hollow profile in such a way that the tubular piece coaxially surrounds the location of the rim hole to be produced and comes to lie there coaxially to a common axis of the opposite holes, and drawing hollow profile material of of a section the hollow profile located between an edge of at least one of the opposite holes and an inside of the tubular piece into the hollow profile interior by at least one punch until said hollow profile material bears flat against the inside of the tubular piece so as to form the rim hole, wherein the two opposite holes are holes of different sizes, wherein a larger hole of the opposite holes is dimensioned in such a way that its hole edge terminates flush with the inside of the tubular piece, and wherein the hollow profile material is drawn in only on a side of a smaller hole of the opposite holes, the hole diameter and the hollow profile section being dimensioned in such a way that the hollow profile section extends across the entire length of the tubular piece after the drawing operation.

12. A method for production of a rim hole in a hollow profile comprising:

punching two opposite holes out of a hollow profile, at least one of the two holes having a diameter which is smaller than that of the rim hole to be produced, by interaction of a perforating die pushed into the hollow profile, and two opposite perforating punches between which the hollow profile lies, pushing a tubular piece into an interior of the hollow profile in such a way that the tubular piece coaxially surrounds the location of the rim hole to be produced and comes to lie there coaxially to a common axis of the opposite holes, and drawing hollow profile material of of a section the hollow profile located between an edge of at least one of the opposite holes and an inside of the tubular piece into the hollow profile interior by at least one punch until said hollow profile material bears flat against the inside of the tubular piece so as to form the rim hole, wherein the drawing operation is effected by a follow-on contour of the punch adjoining a cutting edge formed on the end face of the punch, and wherein the hollow profile material of the hollow profile section is drawn into a recess of the tubular piece which encircles in an annular manner, and is open toward an end face of the tubular piece.

13. The method as claimed in claim 12, wherein the hollow profile material is drawn in in such a way that the hollow profile material engages behind undercut surfaces of the recess of the tubular piece.

14. The method as claimed in claim 13, wherein the two opposite holes are the same size.

15. The method as claimed in claim 13, wherein the two opposite holes are holes of different sizes, wherein a larger hole of the opposite holes is dimensioned in such a way that its hole edge terminates flush with the inside of the tubular piece, and wherein the hollow profile material is drawn in only on a side of a smaller hole of the opposite holes, the hole diameter and the hollow profile section being dimensioned in such a way that the hollow profile section extends across the entire length of the tubular piece after the drawing operation.

16. The method as claimed in claim 12, wherein the two opposite holes are the same size.

17. The method as claimed in claim 12, wherein the two opposite holes are holes of different sizes, wherein a larger hole of the opposite holes is dimensioned in such a way that its hole edge terminates flush with the inside of the tubular piece, and wherein the hollow profile material is drawn in only on a side of a smaller hole of the opposite holes, the hole diameter and the hollow profile section being dimensioned in such a way that the hollow profile section extends across the entire length of the tubular piece after the drawing operation.

18. A method for production of a rim hole in a hollow profile comprising:

punching two opposite holes out of a hollow profile, at least one of the two holes having a diameter which is smaller than that of the rim hole to be produced, by interaction of a perforating die pushed into the hollow profile, and two opposite perforating punches between which the hollow profile lies, pushing a tubular piece into an interior of the hollow profile in such a way that the tubular piece coaxially surrounds the location of the rim hole to be produced and comes to lie there coaxially to a common axis of the opposite holes, and drawing hollow profile material of of a section the hollow profile located between an edge of at least one of the opposite holes and an inside of the tubular piece into the hollow profile interior by at least one punch until said hollow profile material bears flat against the inside of the tubular piece so as to form the rim hole, wherein the drawing operation is effected by a follow-on contour of the punch adjoining a cutting edge formed on the end face of the punch, wherein the two opposite holes are holes of different sizes, wherein a larger hole of the opposite holes is dimensioned in such a way that its hole edge terminates flush with the inside of the tubular piece, and wherein the hollow profile material is drawn in only on a side of a smaller hole of the opposite holes, the hole diameter and the hollow profile section being dimensioned in such a way that the hollow profile section extends across the entire length of the tubular piece after the drawing operation.

\* \* \* \* \*